(12) United States Patent
Romain (10) Patent No.: US 9,967,377 B1
(45) Date of Patent: May 8, 2018

(54) PHONE INSTANT RECHARGE BATTERY REPLACEMENT APPARATUS

(71) Applicant: Joseph Romain, Providence, RI (US)

(72) Inventor: Joseph Romain, Providence, RI (US)

( * ) Notice: Subject to any disclaimer, the term of this patent is extended or adjusted under 35 U.S.C. 154(b) by 0 days. days.

(21) Appl. No.: 14/944,751

(22) Filed: Nov. 18, 2015

Related U.S. Application Data

(60) Provisional application No. 62/135,241, filed on Mar. 19, 2015.

(51) Int. Cl.
*H04M 1/00* (2006.01)
*H04M 1/02* (2006.01)

(52) U.S. Cl.
CPC .. *H04M 1/0262* (2013.01); *H04M 2001/0204* (2013.01)

(58) Field of Classification Search
CPC ....... H04W 64/00; H04W 4/02; H04W 4/021; H04W 4/028
USPC ................. 455/575.1–575.9, 90.1–90.3, 11.1
See application file for complete search history.

(56) References Cited

U.S. PATENT DOCUMENTS

| 5,786,106 A | 7/1998 | Armani |
| D472,549 S | 4/2003 | Nuovo et al. |
| 7,251,471 B2 | 7/2007 | Boling et al. |
| 8,580,416 B2 * | 11/2013 | Cao ........................ G06F 1/1626 320/114 |
| 8,958,849 B2 | 2/2015 | Aldossary |
| 2002/0039910 A1 * | 4/2002 | Malthouse ........... G06K 7/0021 455/558 |
| 2005/0191970 A1 | 9/2005 | Hasegawa |
| 2010/0086840 A1 * | 4/2010 | Shao ................... H01M 2/1066 429/97 |
| 2013/0260825 A1 | 10/2013 | Hagenstad |

FOREIGN PATENT DOCUMENTS

| CN | 204206255 | * | 3/2015 |
| WO | 01/73960 | | 10/2001 |

OTHER PUBLICATIONS

LG G5 Unlocked in Silver, RS988 Silver, 3 pages, available at http://www.lg.com/us/cell-phones/lg-RS988-Silver-g5-unlocked, last accessed May 17, 2017.

* cited by examiner

*Primary Examiner* — Lester Kincaid
*Assistant Examiner* — Sayed T Zewari
(74) *Attorney, Agent, or Firm* — Hayes Soloway PC (57) ABSTRACT

An apparatus for replacing a battery in a housing of a cell phone or other electronic device. The housing has a slot for receiving the battery and further includes a docking pad within the housing. The docking pad provides a locking of the battery in place when the battery is pressed into the slot to contact the docking pad. The battery may be released by either pushing the battery forward a second time or by the use of a separate release button.

17 Claims, 7 Drawing Sheets

PHONE INSTANT RECHARGE BATTERY REPLACEMENT APPARATUS

RELATED CASES

Priority for this application is hereby claimed under 35 U.S.C. § 119(e) to commonly owned and U.S. Provisional Patent Application No. 62/135,241, which was filed on Mar. 19, 2015, and which is incorporated by reference herein in its entirety.

FIELD OF THE INVENTION

The present invention relates in general to cell phones and pertains more particularly to an improved technique for the replacement of a battery of a cell phone or the like electronic device.

BACKGROUND OF THE INVENTION

In today's world, almost none of us can truly escape the need for the use of a smart-phone or the like device. Today's cell phones are quite sophisticated compared to what we used to have a couple of decades ago. They are built to multitask and can sometimes do more than we need them for. However, despite of all the glamour and sophistication, there is still a primitive side of the phone that we are all quite familiar with, that we seem to forget about, which needs an improvement and some level of sophistication, too, and that's the battery.

Nowadays, there is a need to always have to charge and recharge the phone many times throughout the day to keep up with ongoing demands. Presently, there are only two options available. If you have a built-in battery phone, like an iPhone, your only option is to recharge by plugging it in. However, the re-charging takes time, which is not necessarily readily available. If you have a removable battery phone, like a Samsung, you can take the next step of taking the phone apart to remove and replace the battery with a charged one, but over time, you are certainly going to end up messing up your phone through that process of trying to properly remove the battery itself. Today, we are in a war against time itself, life has become a battlefield in which we are trapped, and to survive is to be prepared and to be ready to load and unload very quickly.

Therefore, a main object of the present invention is to provide an improved device for making it easier to replace a battery in a cell phone of virtually any type. It's not the reinvention of the phone, but simply a very important improvement which will revolutionize the industry and will change the way we use phones for generations to come.

SUMMARY OF THE INVENTION

To accomplish the foregoing and other objects, features, and advantages of the present invention, there is the solution to replace the drained battery with a charged one, in a more efficient way. The present invention provides for an improvement whereby the cell phone battery can be removed much easier and be replaced without having to cause any damage to the basic cell phone unit. To do that, there is an opening on the side of the phone where one would eject the drained battery out to slide the charged one in, just a little push would release it, ejected to be removed, and as long as one keeps up with a charged one close by, the exchange occurs easily every time. Dealing with a dead battery would simply become a thing of the past. To make it even easier, the present invention goes one step further to make the phone with a small permanent battery built in to hold some charge, to keep the cell phone "ON" throughout the battery replacement process.

In accordance with one version of the present invention there is provided a mechanism for replacing a battery in a housing of a cell phone, wherein the housing has a sidewall with a slot for receiving the battery and further including a docking pad within the housing disposed within a space defined by the housing. The docking pad provides a locking of the battery in place when the battery is pressed into the slot to contact the docking pad. The battery is removable by pressing the battery inward in order to release the docking pad and enable the battery to be manually withdrawn from the cell phone housing.

In accordance with other aspects of the present invention including a spring at the docking pad to assist in releasing the battery; including a locking surface of the docking pad that holds the battery in place once inserted into the housing; wherein the spring is activated by pressing again on the battery; wherein the housing and the battery are both of rectangular shape; including a separate battery disposed within the housing; including an electrical circuit for interconnecting the replaceable battery and the separate battery; wherein the electrical circuit is a parallel circuit in which the respective replaceable battery and the separate battery are arranged in a parallel circuit; and wherein the cell phone has an electrical input to which the electrical circuit connects.

In accordance with another version of the present invention there is provided an apparatus for replacing a battery in a housing of a cell phone, wherein the housing has a sidewall with a slot for receiving the battery and further including a docking pad within the housing disposed within a space defined by the housing. The docking pad provides a locking of the battery in place when the battery is pressed into the slot to contact the docking pad. A release button is accessible on the cell phone housing, including a coupling element to connect the release button to the docking pad. The release button is manually actuatable to release the docking pad.

In accordance with other aspects of the present invention including a spring at the locking to assist in releasing the battery; including a locking surface of the docking pad that holds the battery in place once inserted into the housing; wherein the spring is activated by manually pressing the release button; wherein the housing and the battery are both of rectangular shape; including a separate battery disposed within the housing; including an electrical circuit for interconnecting the replaceable battery and the separate battery; wherein the electrical circuit is a parallel circuit in which the respective replaceable battery and the separate battery are arranged in a parallel circuit; and wherein the cell phone has an electrical input to which the electrical circuit connects.

In accordance with still another version of the present invention there is provided a method for replacing a battery in a housing of a cell phone, including providing the housing having a sidewall with a slot in the sidewall for receiving the battery, including providing a docking pad within the housing disposed within a space defined by the housing, locking the battery in place in the housing when the battery is fully inserted, and releasing the battery by means of one of providing a separate release button for unlocking the battery, and pressing the battery inward in order to release the battery. The method may also include providing a separate battery and a parallel electrical circuit for interconnecting the replaceable battery and the separate battery, a removal of the replaceable battery leaving electrical power to the cell phone by virtue of the connection of the parallel arrangement of the separate battery.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which:

FIG. 7 is a circuit diagram illustrating the rechargeable battery as well as the permanent battery used for powering the cell phone;

DETAILED DESCRIPTION

Figure 8:
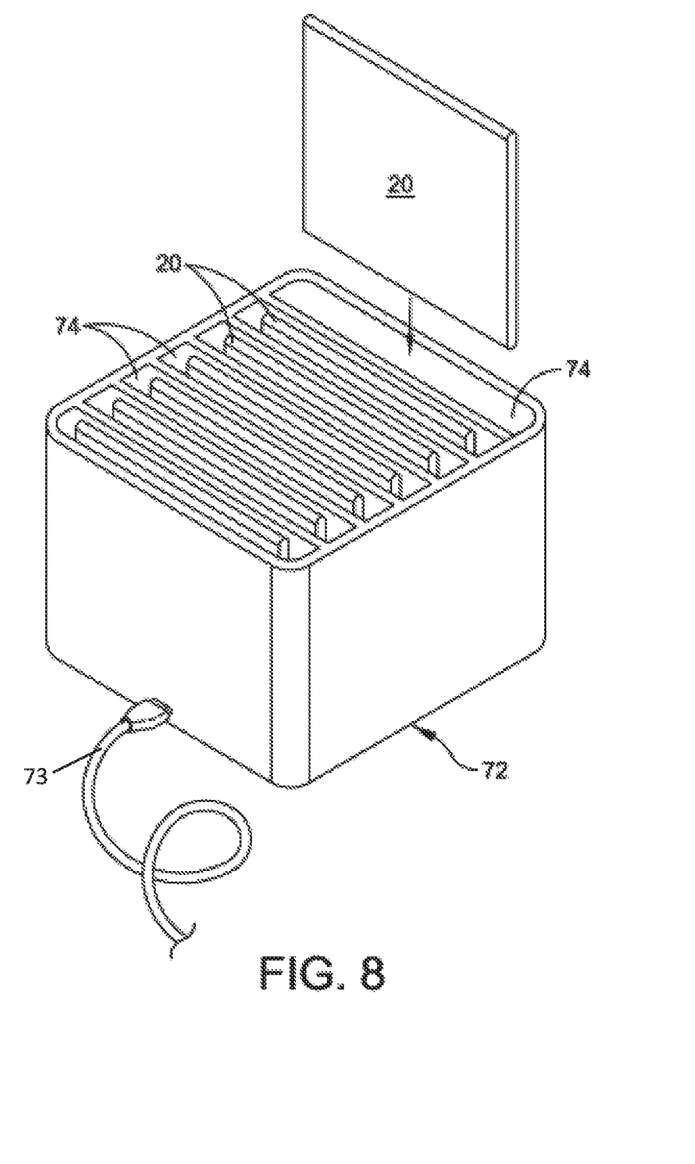
FIG. 8 is a diagram of an alternate charging apparatus.
Figure 9:
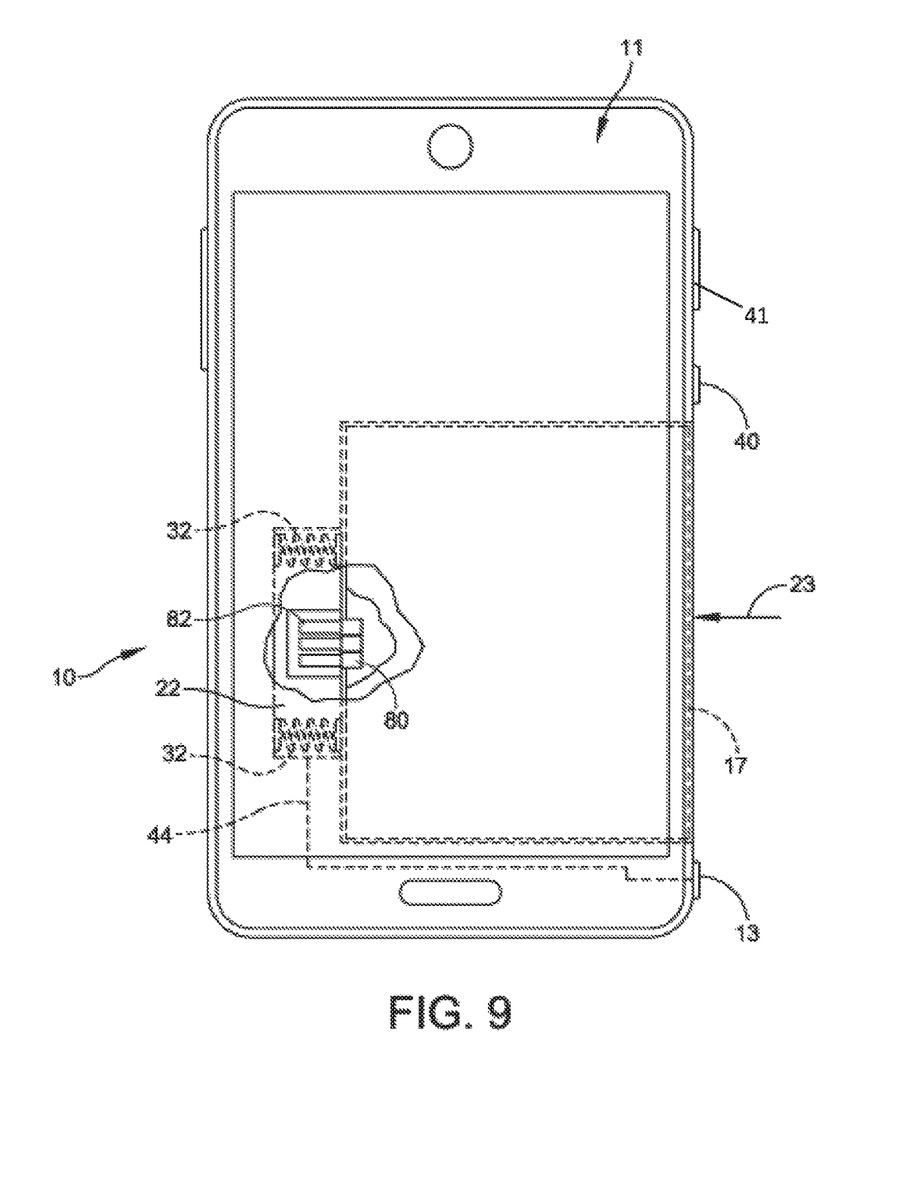
FIG. 9 is a plan view of an alternate embodiment.

Reference is now made to the drawings and, in particular, to FIGS. 1-6 that illustrate a cell phone 10 that is adapted in order to receive a battery 20 in a more accommodating manner so that the battery 20 can be readily inserted and yet also readily released from the cell phone housing 11 in order to replace the battery 20 with a previously charged battery. FIG. 7 is a schematic diagram illustrating a parallel circuit arrangement for connecting the rechargeable battery 20 and the permanent battery 50. FIG. 8 is a diagram of an alternate charging apparatus 72. FIG. 9 is a plan view of an alternate embodiment.

The present drawings illustrate basically two separate embodiments of the present invention. The first embodiment is described in which there is a docking pad 22 that can be used, when pressed against, as a locking mechanism while, at a later time, the battery 20 can be pushed in the direction of arrow 23 in FIG. 6 to release the battery 20, actuating a spring mechanism 32 for ejecting the battery 20. A second embodiment of the present invention employs a separate release button 13 for controlling the docking pad 22 so as to release the battery 20 from the docking pad 22.

Regarding the first embodiment that does not use a release button 13, reference is made to the drawings showing a cell phone at 10 that includes all the normal internal structure for the proper operation of the cell phone 10 including an outer housing 11. The housing 11 may be provided in separate upper and lower sections. The outer housing 11 is illustrated as being provided with a sidewall 12 that is provided with an elongated slot 14 dimensioned to receive the battery 20. The elongated slot 14 extends from the sidewall surface at 12 internally to location 14A illustrated in FIG. 1. The battery 20 may be of conventional design or may be particularly configured in order to be properly received in the side elongated slot 14. The elongated slot 14 may be provided with side grooves for guiding the battery 20.

Figure 1:
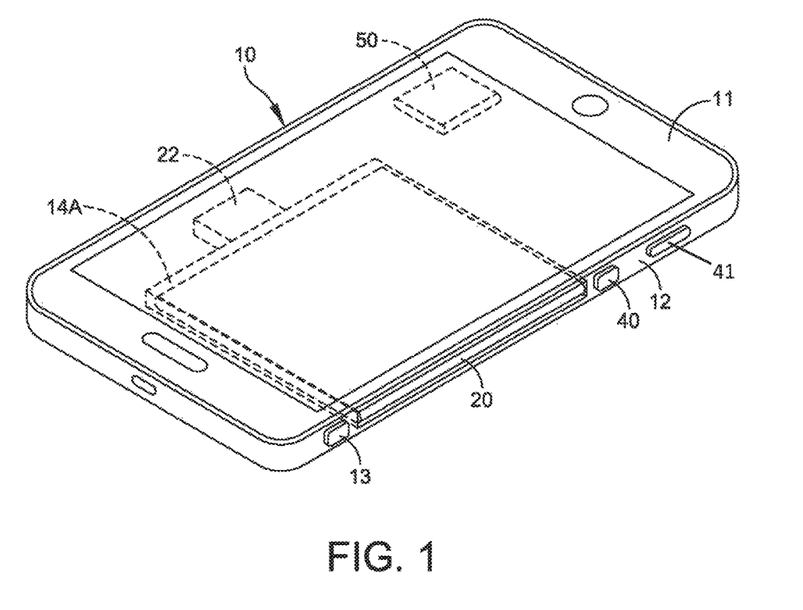
FIG. 1 is a perspective view illustrating the novel battery replacement arrangement of the present invention in association with a cell phone.
Figure 2:
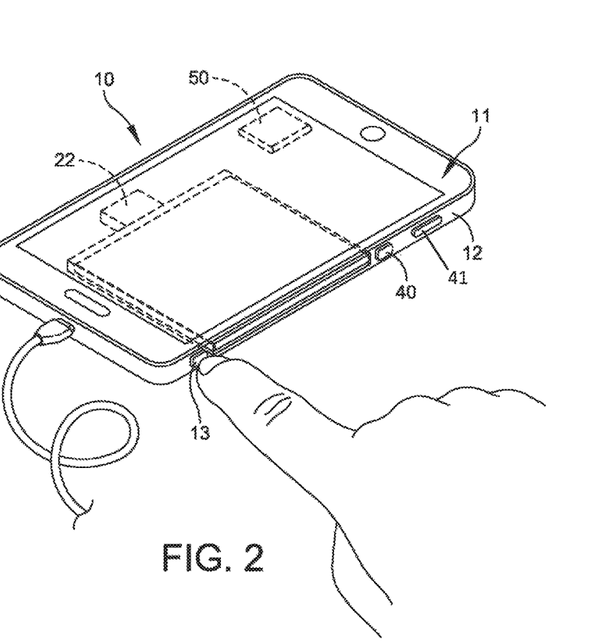
FIG. 2 is a perspective view of one embodiment of the present invention employing a separate release button for ejecting the battery.
Figure 3:
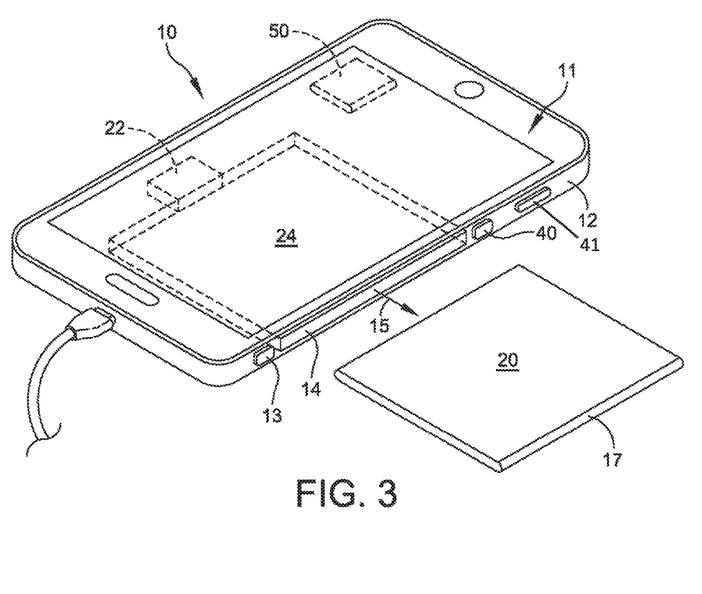
FIG. 3 is an exploded perspective view of the cell phone showing the battery having been removed in the direction of the arrow shown.
Figure 5:
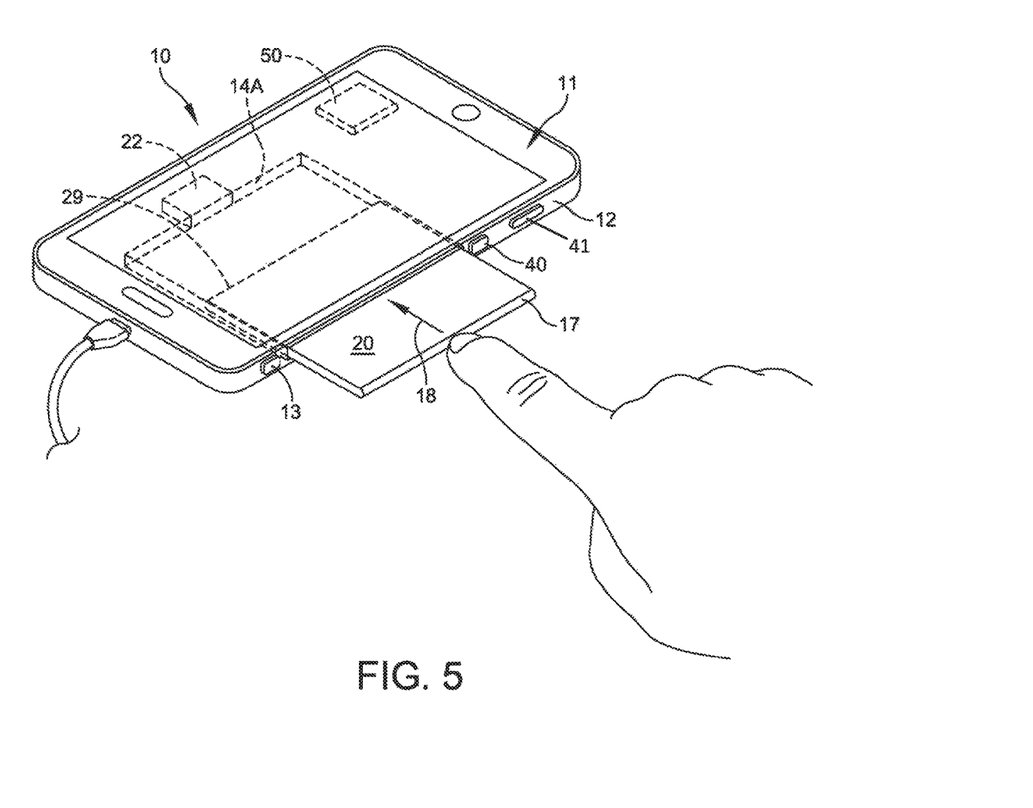
FIG. 5 is a perspective view illustrating the user inserting the battery into the slot of the cell phone.

At the very base of the elongated slot 14 there is located a docking pad 22 shown in phantom in FIGS. 1 and 2. This docking pad 22 may be designed so that it either holds the battery 20 in place or releases the battery 20 depending upon the action made by the user of the device 10. FIG. 3 shows the battery 20 out of the outer housing 11, but also shows the internal battery space 24. In FIG. 5, the docking pad 22 is in a position in readiness to receive the end of the battery 20 to lock the battery 20 in place. The battery 20 can then be inserted in the direction of arrow 18 until the end 29 of the battery 20 engages the docking pad 22 locking the battery 20 in place by means of the docking pad 22 being in the form of a locking mechanism.

Figure 6:
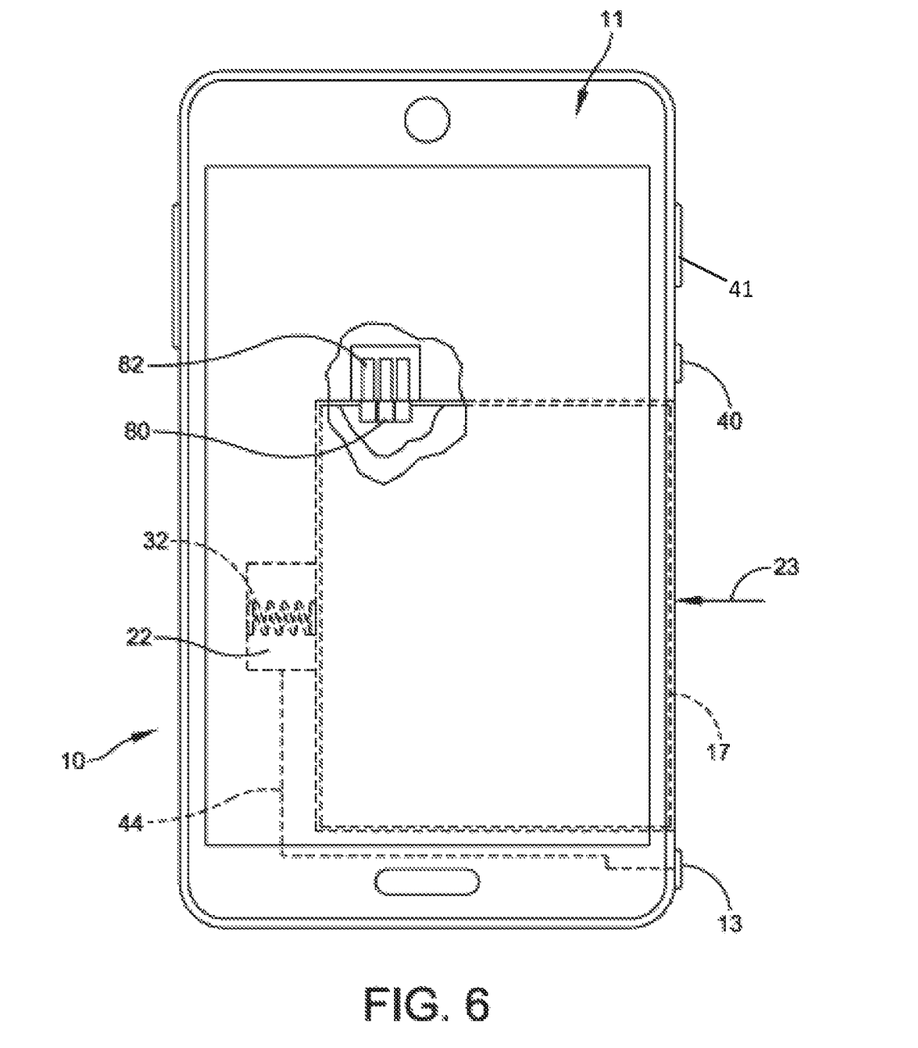
FIG. 6 is a plan view of the cell phone and battery showing further features.

Referring now to FIGS. 1 and 6, the battery 20 is considered as fully inserted and locked in place in the cell phone outer housing 11. In order to release the battery 20 for replacement thereof, the battery 20 at its front 17 may be pressed in the direction of arrow 23 in order to release the lock on the battery 20. Preferably, there should also be provided a spring 32 (refer to the schematic diagram of FIG. 6) associated with the docking pad 22, so that when the battery 20 is pressed in the direction of arrow 23, the spring 32 causes the battery 20 to be released outwardly from the cell phone outer housing 11 in the direction of arrow 15 (See FIG. 3). Thus, in this embodiment, the docking pad 22 functions as a locking mechanism but at the same time, when the battery 20 is pressed once again, this releases the locking mechanism, and the depicted spring 32 causes the battery 20 to be released outwardly. At that position, the user can then easily grasp the battery 20 and fully remove the battery 20 from the outer housing 11. Another charged battery 20 can then be installed in the elongated slot 14, pressed into the elongated slot 14 against the docking pad 22, and thus locked in position in readiness for activating the cell phone 10. Again, the battery 20 can be easily removed when discharged by pressing in the direction of arrow 23 per FIG. 6 in order to release the battery 20 from the docking pad 22, releasing the battery 20 to a position where it can easily be removed. This arrangement is very convenient because, by a simple release mechanism, one can readily insert and subsequently release the battery 20.

In accordance with another embodiment of the present invention, rather than having the docking pad 22 lock and unlock based upon the motion of the battery 20, there is also provided a release button 13 such as illustrated in FIGS. 1-3 that can be depressed by the user as illustrated in FIG. 2. Reference may also be made to the plan view of FIG. 6 that shows the release button 13 and a connecting link 44 from the release button 13 to the docking pad 22. In this particular embodiment, ejection of the battery 20 is achieved by means of depressing the release button 13 rather than pressing against the outer surface of the battery 20 itself. In this embodiment, when the battery 20 is inserted, it is locked in position by means of the docking pad 22 functioning as a locking mechanism. This locking mechanism is then released by means of depressing the release button 13 on an outer surface of the cell phone housing 11.

Figure 4:
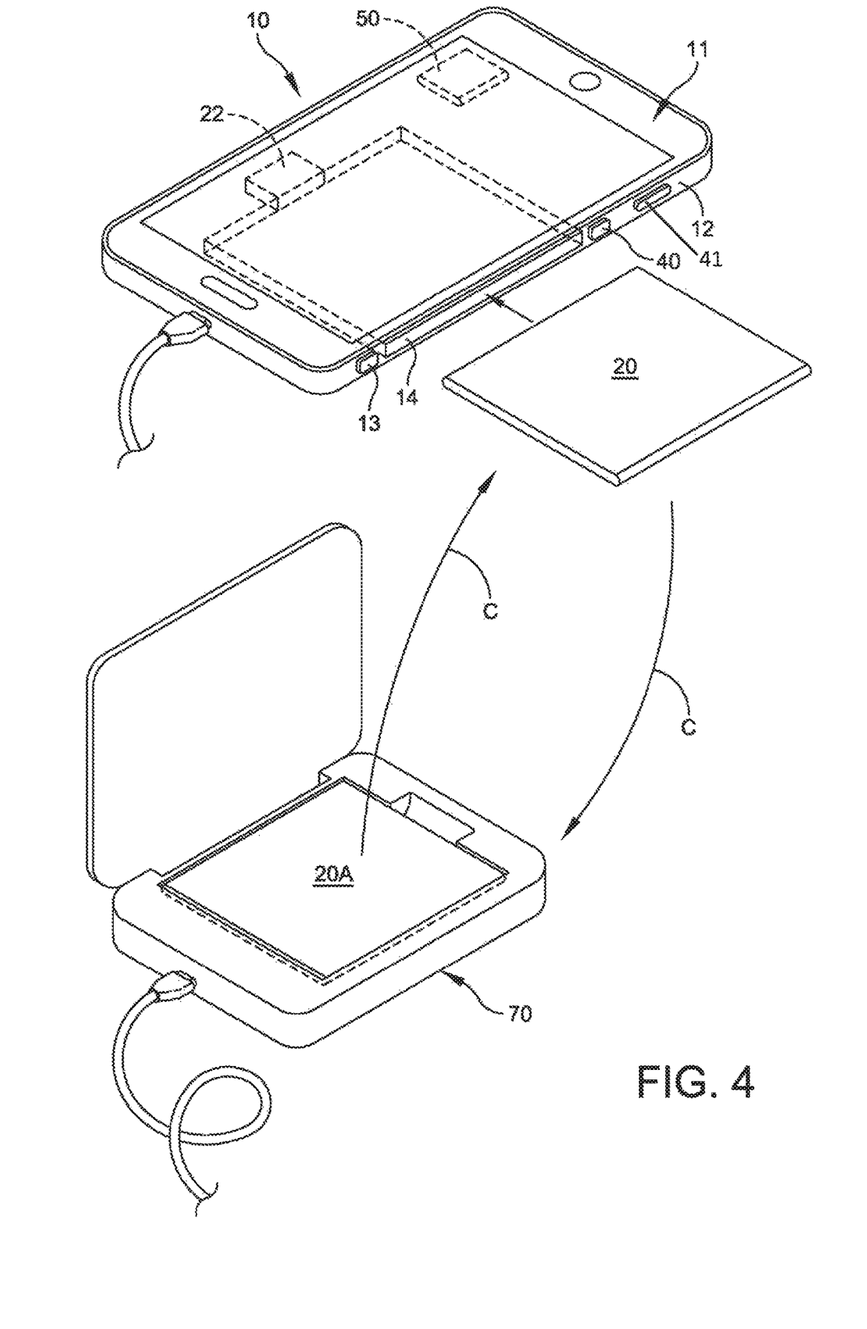
FIG. 4 is an exploded perspective view showing the cell phone and the battery, as well as a separate charging station.

Reference is now also made to FIG. 4 for a simple illustration of the substitution of a battery 20 between the cell phone 10 and the battery charger 70. In FIG. 4, a standard charger 70 is illustrated with a battery 20A disposed therein. In FIG. 4, the arrows C depict the swapping of the batteries 20, 20A so that a depleted energy battery can be replaced by a fully charged battery.

FIG. 6 also shows the release button 13 and the interconnecting link 44 that connects the release button 13 with the docking pad 22. FIG. 6 also schematically illustrates the release spring 32 that may be urged against an end wall of the battery 20. FIG. 6 also illustrates contacts 80 on the battery 20 and like-contacts 82 in the cell phone housing 11. Thus, when the battery 20 is fully installed, these contacts 80, 82 are bridged in order to provide power to the cell phone electronics 60. Refer also to an alternate embodiment shown in FIG. 9, which includes a docking pad 22 with the contacts 80 and 82 disposed at that location. FIG. 9 also illustrates a pair of springs 32 that may be considered as part of the docking pad 22 and disposed on either side of the contacts 80, 82.

In accordance with another aspect of the present invention, cell phone 10 also includes its own primary permanent battery "built in" to keep the device 10 "ON" and thus undisturbed throughout the entire recharging or exchange process. Additionally, it is an objective of the present invention to provide the capability to charge multiple batteries at the same time mounted side by side, constructed and arranged to take any quantity (e.g., 2, 4, 6, 8, or 10) batteries 20 next to each other for the comfort of an everlasting back-up recharge battery 20.

With regard to the use of a permanent battery, refer in the figures to the permanent battery 50. Refer also to the circuit diagram of FIG. 7 illustrating the replacement battery at 20 and the permanent battery at 50. FIG. 7 also illustrates the parallel circuit 64 which connects both batteries 20, 50 essentially in parallel with the cell phone electronics 60. FIG. 7 also illustrates a disconnection node at D wherein the replaceable battery 20 is ejected and replaced. Even when that occurs, the battery 50, by means of the parallel circuit 64, maintains power to the cell phone electronics 60.

One main feature of the present invention is to provide a new mechanism to make it easier to replace the battery 20 in a cell phone 10 or virtually any portable electronic devices that constantly needs to be recharge multiple times including tablets, notebooks, notepads, and virtually any other portable electronic device, including cell phones which constantly need to be recharged. As illustrated herein, these devices 10 are built with an opening (e.g., elongated slot 14) on the side to insert the charged battery 20. To recharge the devices, one would simply press a release button 13, which releases a spring mechanism 32 that ejects that drained battery 20 out on the side of device 10. One would remove it and replace it with another charged one, which was being recharged on the side (e.g., on an external charger 70).

In some cases, these batteries 20 have a unique design characteristic to allow them to slide-in easily into the device 10. More specifically, in some cases, a groove on the side of battery 20 allows it to slide easily into the device 10, which has a corresponding edge. This may be in the form of a tongue-and-groove structure between the battery 20 and its accommodating elongated slot 14.

The present invention also proposes that all subscriber identity module (SIM) cards and secure digital (SD) memory cards have slots on the side of the devices for faster, easy access. The present invention also introduces a new technique that will allow one to make a quick "Emergency Distress-Call" particularly for extreme emergency situations, where one may not be able to see, talk, or have time to use a phone keypad. By simply holding the emergency distress call (EDC) button for 2 seconds, a low-volume prompt can be heard and a yes-or-no text pops up on display. Pressing the EDC button again will automatically call 9-1-1 and discretely turn "on" your global positioning system (GPS) location and perhaps even your handset, and more, a second button to alert family, friends, and relatives, which can be canceled by the home button. These features may affect the device's accessories, including phone-covers, pouches, cases, etc., virtually any items related to the change. Furthermore, any objects such as a new outlet plug may be implemented for the practical use of the invention.

In the present invention, this allows your phone to stay on as the battery 20 is being replaced. Also, no mechanical forces and no use of electrical energy will be needed to accomplish this task. Everything is manual and can be accomplished anywhere in the world very quickly whether you are in a desert, a jungle, or anywhere else in the world, all it requires is that you stay prepared by keeping up a few extra-charge batteries with you at all times.

In the drawings, in addition to the battery release button 13, there is also illustrated a further button 40. This may be the EDC (e.g., instant 9-1-1) button 40. Next to the button 40 is a power button at 41.

Reference is also now made to FIG. 8 for an alternate charging apparatus 72. This is particularly useful for charging multiple batteries 20 at the same time. FIG. 8 shows a single battery 20. However, multiple batteries 20 can be inserted into each of the parallel arranged slots 74. Each slot 74 includes a connector for receiving the battery terminals. These connectors are arranged in a parallel circuit so that a charging signal from the input line 73 is coupled to each of the connectors at the respective slots 74.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A cell phone with a battery replacing mechanism comprising:

a housing including a sidewall having an opening defined therein, wherein the opening is configured to permit a battery to be inserted into and removed from the housing;

a slot disposed in the housing and configured to host the battery;

an electronic contact disposed in the housing and configured to electrically couple with the battery;

a docking pad disposed in the housing laterally adjacent the slot and configured to lock the battery in place within the slot when the battery is pressed into the slot and physically engaged on only one side by the docking pad, wherein the battery is removable from the slot by pressing the battery inward toward the docking pad, causing release of the battery from the docking pad, and wherein the battery is able to be withdrawn manually from the slot;

at least one spring disposed at the docking pad and configured to assist in releasing the battery from the docking pad, wherein the at least one spring is configured to be activated by pressing the battery inward toward the docking pad;

a release button disposed on the housing and configured to be depressed to cause disengagement of the battery from the docking pad;

a permanent primary battery disposed in the housing and configured to provide power to the cell phone; and an electrical circuit configured to electrically couple the battery and the permanent primary battery in parallel such that when the battery is not electrically coupled with the electronic contact, the permanent primary battery maintains power to the cell phone.

2. The cell phone of claim 1, wherein the docking pad comprises a locking surface configured to engage an exterior of the battery such that when the battery is inserted into the slot, the docking pad holds the battery in place.

3. The cell phone of claim 1, wherein the slot and the battery are both of rectangular shape.

4. The cell phone of claim 1, wherein the release button is disposed on the sidewall of the housing.

5. The cell phone of claim 1, wherein the slot includes a feature configured to engage a corresponding groove disposed on a side of the battery.

6. The cell phone of claim 1, further comprising an electrical input configured to be connected to the electrical circuit to charge at least one of the battery and the permanent primary battery.

7. A cell phone apparatus with a battery replacing mechanism comprising:
a housing including a sidewall having an opening defined therein, wherein the opening is configured to permit a first battery to be inserted into and removed from the apparatus;
a docking pad disposed within a space defined by the housing, wherein the docking pad is configured to lock the first battery in place when the first battery is pressed into the opening to contact the docking pad, and wherein the docking pad is configured to contact only a single side of the first battery;
a release button disposed on an exterior of the housing and configured to cause disengagement of the docking pad from the first battery;
a coupling element operatively coupling the release button to the docking pad to cause disengagement of the docking pad from the first battery;
at least one spring disposed at the docking pad and configured to assist in releasing the first battery, wherein the at least one spring is activated by pressing the release button;
a second battery disposed within the housing and configured to provide backup power to the apparatus; and
an electrical circuit configured to electrically couple the first battery and the second battery in parallel such that when the first battery is not providing primary power to the apparatus, the second battery provides backup power to the apparatus.

8. The apparatus of claim 7, wherein the docking pad comprises a locking surface configured to engage the single side of the first battery such that when the first battery is inserted into the apparatus, the docking pad holds the first battery in place.

9. The apparatus of claim 7, wherein:
the at least one spring comprises a pair of springs disposed in the housing, opposite to the opening, adjacent the single side of the first battery; and
the apparatus further comprises at least one electrical contact disposed between the pair of springs and configured to make electrical contact with the first battery when the first battery is inserted into the apparatus.

10. The apparatus of claim 7, wherein the first battery is of rectangular shape and includes an external structural feature configured to slide into mated engagement with a corresponding internal structural feature of the housing.

11. The apparatus of claim 7, wherein the electrical circuit comprises a disconnection node between the first battery and the second battery.

12. The apparatus of claim 7, further comprising an electrical input to which the electrical circuit connects in charging at least one of the first battery and the second battery.

13. A method for replacing a battery in a housing of a cell phone, the method comprising:
providing the housing having a sidewall with an opening for receiving the battery;
providing a docking pad within the housing disposed within a space defined by the housing, wherein the docking pad is configured to lock the battery in place in the housing when the battery is fully inserted, and wherein the docking pad is configured to contact only a single side of the battery;
providing a release button on the housing, wherein the release button is configured to unlock the battery from the docking pad such that in pressing the battery inward, the battery is released and removable from the housing through the opening;
providing a permanent primary battery; and
providing a parallel electrical circuit for interconnecting the battery and the permanent primary battery in parallel such that during removal of the battery, the permanent primary battery provides electrical power to the cell phone.

14. The cell phone of claim 1, wherein the electronic contact and the docking pad are disposed at different locations in the housing.

15. The cell phone of claim 1, wherein the electronic contact is disposed at a location of the docking pad in the housing.

16. The cell phone of claim 1, wherein the at least one spring comprises two springs disposed adjacent one another at a location of the docking pad in the housing.

17. The cell phone of claim 16, wherein the electronic contact is disposed between the two springs at the location of the docking pad in the housing.

* * * * *